United States Patent [19]

Farmer et al.

[11] 4,414,594

[45] Nov. 8, 1983

[54] LINEAR ACTUATOR FOR A MEMORY STORAGE APPARATUS

[75] Inventors: Paul L. Farmer, San Martin; Frank C. Gibeau, Los Altos; Stanley F. Brown, Cupertino; Garold W. Plonczak, Santa Clara, all of Calif.

[73] Assignee: Atasi Corporation, San Jose, Calif.

[21] Appl. No.: 352,943

[22] Filed: Feb. 26, 1982

[51] Int. Cl.[3] .................. G11B 5/55; H02K 41/02
[52] U.S. Cl. .................................. 360/106; 310/13; 318/38
[58] Field of Search .................. 360/106; 310/12, 13; 318/38, 135

[56] References Cited

U.S. PATENT DOCUMENTS

| 3,505,544 | 4/1970 | Helms | 310/13 |
|---|---|---|---|
| 3,656,015 | 4/1972 | Gillum | 310/13 |
| 3,659,124 | 4/1972 | Lathrop | 310/13 |
| 3,735,163 | 5/1973 | Dijkstra et al. | 310/13 |
| 4,075,517 | 2/1978 | Adler | 360/106 |
| 4,247,794 | 1/1981 | Jouss et al. | 310/13 |
| 4,287,445 | 9/1981 | Lienau | 310/13 |
| 4,305,105 | 12/1981 | Ho et al. | 360/106 |
| 4,344,022 | 8/1982 | Von Der Heide | 318/38 |

FOREIGN PATENT DOCUMENTS 52-49007  4/1977  Japan .................. 360/106

OTHER PUBLICATIONS

Frater, "Balanced Force Voice-Coil Actuator," IBM Tech. Disc. Bul., vol. 15, No. 3, 8/72, p. 749.
Guzman et al., "Voice Coil Motor," IBM Tech. Disc. Bul., vol. 20, No. 5, 10/77, pp. 1689-1690.

*Primary Examiner*—Stuart N. Hecker
*Attorney, Agent, or Firm*—Alan H. MacPherson; Thomas S. MacDonald; Steven F. Caserza

[57] ABSTRACT

A dual motor linear actuator is disclosed for use in a magnetic disc drive device. It includes a carriage reciprocatably guided between a pair of guide rails, with the accessing transducers being mounted to its inner end. Separate rectangular drive coils are affixed in symmetrical outboard relationship at the sides of the body of the carriage. The actuator assembly further includes two pairs of slab shaped magnets mounted to E-shaped magnet support structures that are integrally formed with the base of the disc drive device. The magnets are mounted to form two air gaps that are symmetrically disposed relative to a center plane and so that they respectively cooperate with the drive coils to apply motive forces on the carriage generally along two lines that are equidistantly spaced from the aforesaid plane of symmetry. The outer ends of pole pieces of the two magnet support structures are rigidly interconnected by a single plate that acts as an end pole piece for both magnet support structures.

21 Claims, 4 Drawing Figures

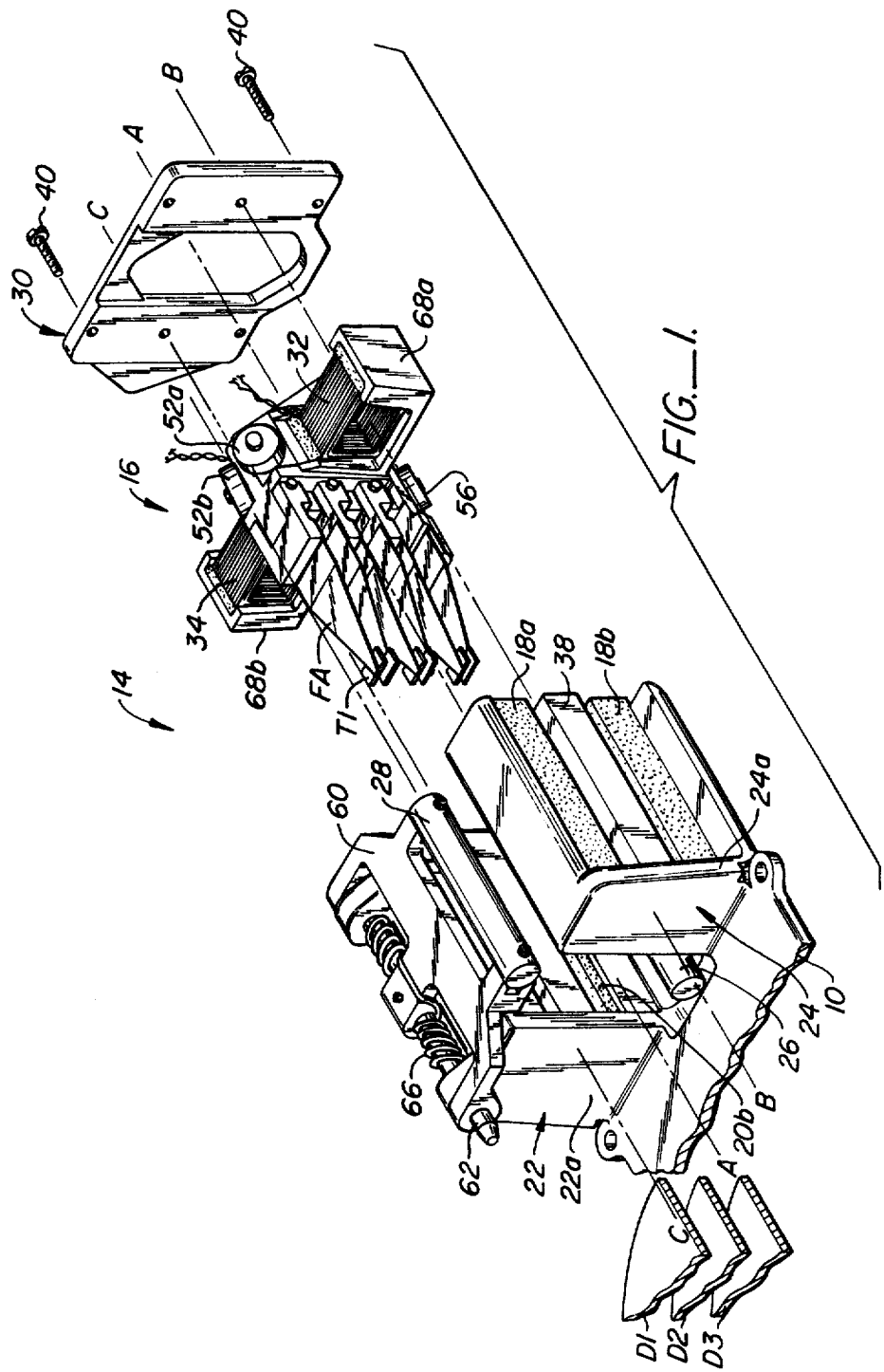
FIG._1.

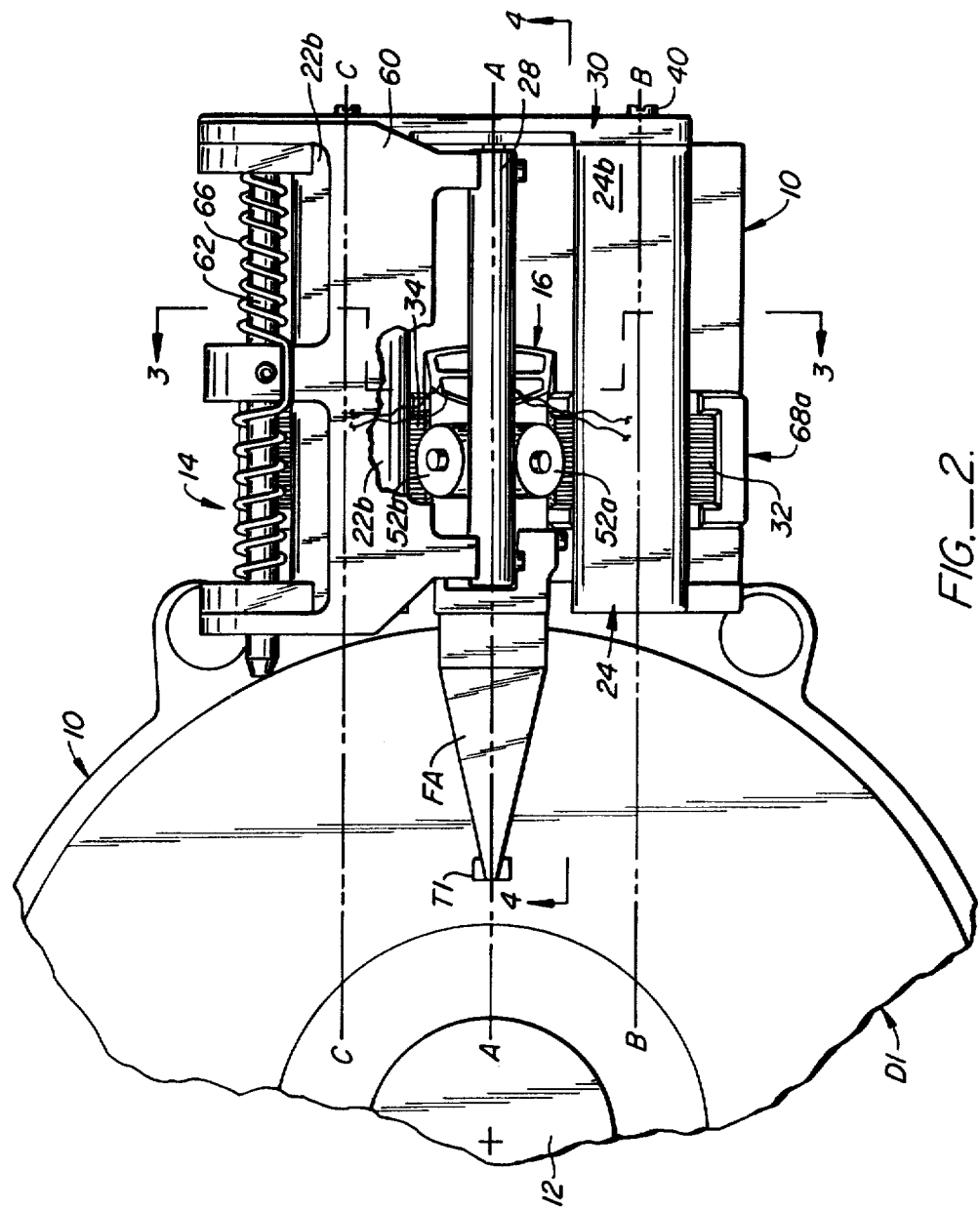
FIG._2.

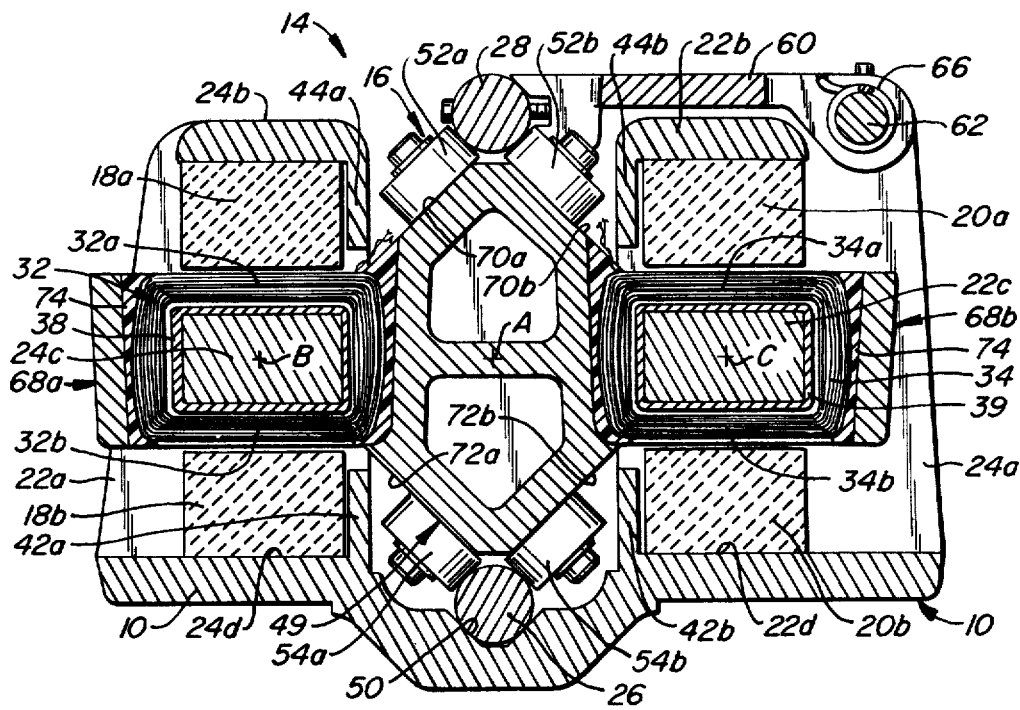
FIG._3.
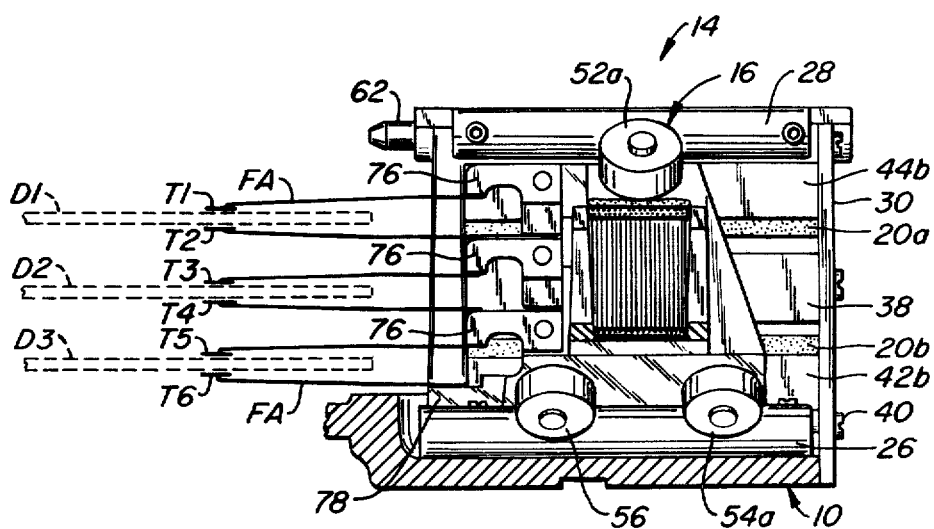
FIG._4.

LINEAR ACTUATOR FOR A MEMORY STORAGE APPARATUS

BACKGROUND OF THE INVENTION

The present invention generally relates to memory storage apparatus, and more particularly, the invention concerns an improved memory storage apparatus having a linear actuator for reciprocatably positioning a transducer relative to a disc or other media upon which information is recorded. The actuator is referred to as a linear actuator because it is adapted to move the transducer along a straight line relative to the media of the memory storage apparatus.

The present invention provides a linear actuator particularly useful in a magnetic memory storage apparatus of the type known in the art as a Winchester magnetic disc memory storage apparatus. The actuator is situated adjacent the peripheries of several vertically spaced discs and is designed to rapidly position the transducers to access recorded disc information. The transducers normally comprise floating read/write heads. Although the present invention shall be described in connection with the Winchester disc drive unit, it will be appreciated that the actuator will be useful in other types of electromagnetic memory storage apparatus and also can be directly applied in optical memory storage apparatus wherein an optical transducer or several optical transducers are incorporated in the actuator.

The need for a compact, high capacity magnetic disc memory storage apparatus has generated much interest in recent years in the Winchester type of disc drive device. Due to the increased track density made possible by recent developments, there has been an ongoing attempt to provide an actuator capable of extremely rapid access time and yet which is compact. Although some actuators have been generally satisfactory, the known prior actuator designs have not been able to meet most of the following objectives: occupying a relatively small radial dimension at the peripheries of the rotating discs (e.g., approximately twice as great as the intended total stroke of the actuator); providing a sufficiently high magnetic force constant to both rapidly accelerate and decelerate the carriage (achieve extremely rapid access times) and also hold the carriage steady against minor vibrations transmitted to the actuator through the base of the storage apparatus; maintaining any magnetic leakage in front of the actuator adjacent the peripheries of the discs to a level well below that which would erase or adversely affect the information magnetically recorded on the surfaces of the discs; and providing a carriage support and drive arrangement which eliminates concerns about resonant vibrations induced by the required rapid acceleration and deceleration of the carriage.

SUMMARY OF THE INVENTION

The rotating disc memory storage apparatus of the present invention includes an improved linear actuator which satisfies the aforementioned objectives. The linear actuator includes a carriage, and means for mounting the carriage for reciprocating movement along a linear path that extends generally radially of the rotating disc of the memory storage apparatus. According to the basic feature of the present invention, the carriage is reciprocatably driven by a pair of electromagnetic motors of identical construction that are symmetrically disposed relative to the centerline of the carriage to apply forces to the carriage generally along parallel lines that are laterally spaced and symmetrically disposed relative to the desired linear path of travel of the carriage. The pair of laterally and symmetrically spaced linear motors together provide powerful actuation forces to thereby achieve rapid access times and stabilize the carriage against vibrations. The two motors also occupy only a small radial volume and together produce insignificant magnetic leakage in the vicinity of the peripheries of the rotating discs. The magnets of each of the pair of motors are designed to provide one-half of the force needed to drive the carriage so that the magnetic fields associated with each motor are relatively reduced in comparison to the magnetic field that would be associated with a single linear motor of the known conventional linear actuators. Due to the reduced field strength, the stray leakage at the ends of the linear motors of the present invention will be insignificant.

In the preferred embodiment, the improved actuator assembly of the present invention utilizes two pairs of permanent magnets mounted to the base of a magnetic disc memory storage apparatus in a symmetrical relationship relative to a vertical plane through the desired linear path of travel of the carriage. The carriage has a construction which is also symmetrical about a plane through the carriage's centerline. In the preferred embodiment, two separate drive coils are secured upon the carriage, each coil having at least one effective winding section that registers with the air gap of the associated pair of magnets. This arrangement thus provides two linear electromagnetic motors disposed symmetrically relative to the centerline of the carriage. The coils are connected to the direct-current actuator controller of the memory storage apparatus.

It is noted that a single drive coil may be employed instead of separate coils. Such single coil would have active winding sections at opposite sides of the centerline of the carriage that would register with the air gaps of the two pair of magnets. Separate drive coils are preferred due to the shorter current rise time associated with the shorter winding length of each separate coil.

In the preferred embodiment, each pair of magnets at opposite sides of the centerline of the carriage is mounted upon a pole structure that includes a central pole. This arrangement provides two pairs of air gaps symmetrically located at opposite sides of a plane through the center of the carriage. The coil (or separate coils) mounted to the carriage will have a rectangular outline (or outlines) in a plane normal to its direction of travel to thus provide effective winding sections which register with the respective air gaps. Each linear motor—each motor being comprised of the pair of magnets separated by the central pole and the associated drive coil sections—will apply a force to the carriage generally along a line extending parallel to and equidistant from the center of the carriage.

The preferred arrangement for reciprocatably mounting the carriage to the base of the memory storage apparatus includes two pairs of rollers mounted directly under the centerline and another pair of rollers located directly over the centerline of the carriage. Preferably, the carriage rides on a fixed guide rail mounted to the base of the apparatus midway between the two pairs of magnets, and a preloaded guide rail is biased downwardly against the single pair rollers at the top end of the carriage. The two pairs of rollers are longitudinally spaced so that they stabilize the carriage in its longitudinal direction. Due to the symmetrical application of forces by the two motors at opposite sides of the carriage, the centrally disposed two-rail carriage support arrangement is sufficient to accurately guide the carriage with minimal vibrations.

BRIEF DESCRIPTION OF THE DRAWINGS

FIG. 1 is an exploded isometric view illustrating the preferred embodiment of the linear actuator assembly of the present invention.

FIG. 2 is a fragmentary top plan illustrating the linear actuator assembly and part of the base, spindle and disc of the memory storage apparatus, with the preload rail support being broken away to show the carriage.

FIG. 3 is an enlarged view taken on line 3—3 of FIG. 2.

FIG. 4 is a section taken on line 4—4 in FIG. 2.

DESCRIPTION OF THE PREFERRED EMBODIMENT

Referring now particularly to FIGS. 1-3, a magnetic disc memory storage apparatus includes a base 10 to which a spindle 12 is mounted for rotatably supporting several discs D1-D3. A linear actuator 14 is provided for concurrently moving several accessing transducers T1-T6 along a linear path that extends generally radially of the rotating discs. In particular, the apparatus is a Winchester drive that includes fixed discs of 5.25 in. diameter, with an intended high track density.

The memory storage apparatus is now well known by those of skill in this art. It includes a motor (not shown) for rotating the discs at a high speed and a direct current drive circuit (also not shown) that is operatively connected to the actuator 14. The base 10 is mounted within a closed housing that includes a ventilation system adapted to keep the disc surfaces free of dust.

The present invention relates to the linear actuator 14. As shall now be described in detail, the actuator 14 is very compact—occupying a space that extends about 2 in. outwardly from the periphery of the disc and is positioned about ⅛ in. from the edges of the discs D1-D3. The actuator is capable of reciprocating the transducers T1-T6 through a 1 in. stroke, with practically no stray magnetic leakage in front of the actuator in the vicinity of the peripheries of the rotating discs. Even though the discs are positioned quite close to the permanent magnets of the actuator assembly (see FIG. 2), the information magnetically recorded on the discs will not be affected by the fields of the magnets.

FIG. 1 illustrates the basic elements of the actuator 14. It includes a carriage 16, a first pair of permanent magnets 18a and 18b, a second pair of magnets 20a and 20b, a first magnet support structure 24 for the first pair of magnets 18a and 18b, and a second magnet support structure 22 for the second pair of magnets 20a and 20b. Carriage 16 is reciprocated upon a pair of vertically aligned rails 26 and 28 that are disposed in a plane lying midway between the two pairs of magnets. The actuator further includes a pole plate 30 that is removeably secured to the outer ends of the magnet support structures 22 and 24. All magnets have identical slab shapes; they have the same rectangular cross-section in a plane normal to the direction of travel of the carriage and have the same lengths. Two separate drive coils 32 and 34 are mounted to the carriage in a symmetrical arrangement about the centerline A—A (FIGS. 1-3) of the carriage. The coils are mounted generally outboard of a central body portion of the carriage, as shall be described later. The drive coils are identical and each have flat upper and lower effective winding sections that are aligned within the two air gaps associated with the respective pairs of magnets so that equal forces are applied at both sides of the carriage generally along lines A—A and B—B that are parallel to the linear path of travel of the carriage, which path is of course determined by the guide rails 26 and 28. The length of magnets in the direction of travel of the carriage is substantially greater than the length of coils in the same dimension, thus providing a long-gap short-coil type of linear actuator. The symmetrical arrangement of the drive coils and associated pairs of magnets will be understood as effectively comprising two identical electromagnetic motors that act on the carriage symmetrically at opposite sides thereof to produce balanced driving forces generally along said lines B—B and C—C.

Base 10 of the rotating disc memory storage apparatus is cast from a metal of high magnetic permeability, such as iron. According to a feature of the invention, the magnet support structures 22 and 24 are integrally formed with the base. The term, base, as used herein, means that part of the rotating disc memory storage apparatus to which the disc spindle 12 is mounted. The magnet support structures are, except for the mounting projections for the upper rail 28 (described later), mirror images of each other about a vertical plane through the desired linear path of travel of the carriage. Each structure includes an inner pole piece 22a, 24a that projects perpendicularly upwardly from the base and two parallel pole pieces 22b-22c, 24b-24c, that respectively project perpendicularly from the front or inner pole pieces 22a and 24a. The upper magnet 18a, 20a of each pair of magnets is affixed by a suitable adhesive to the lower surface of the respective upper pole piece 22b, 24b in spaced parallel relation above the central pole piece 22c, 24c. The lower magnet 18b, 20b of each pair of magnets is mounted upon a flat surface or land 22d, 24d machined in the base 10 directly under the respective central pole piece so that the lower magnets are spaced from the respective central pole pieces by the same distances as the upper magnets are spaced thereabove. As may be seen in FIG. 3, rectangular copper tubes 38 and 39 are respectively mounted on the central pole piece 22c and 24c; the tubes are provided to form so-called shorted turns. Two rectangular air gaps are thus formed between the flat upper and lower faces of each shorted turn member 38, 39 and the flat surfaces of the respective upper and lower magnets. It will thus be seen in FIG. 1 that each magnet support structure includes an integral structure in the configuration of the letter E that opens away from the discs and which is closed at its outer end by the removable pole plate 30.

Pole plate 30 has several purposes. It is so secured by screws 40 to the pole pieces 22b-22c and 24b-24c and also to the rear end of the base adjacent the lands 22d and 24d that it is in intimate contact with the integral E-shaped portions of two magnet support structures. Accordingly, the plate provides a return flux path at the outer ends of the two magnet support structures. In this connection, the inner pole pieces 22a and 24a provide return flux paths at the inner ends of respective magnet support structures. That is, plate 30 cooperates with the two integrally formed E-shaped support structures to form two closed-E support structures for the permanent magnets. Such closed-E structures provide a generally uniform magnetic field of the same strength across the length of each of the four air gaps (the "length" of a gas signifying its dimension in the direction of travel of the carriage).

Pole plate 30 also rigidly interconnects the rear ends of the transversely spaced magnet support structures 22 and 24. The carriage 16, as indicated before, is reciprocated at such high speeds that it may tend to induce vibrations in the actuator assembly. The integral formation of the magnet support structure in the base 10 and the rigid interconnection of the free ends of the pole pieces 22a–22b and 24a–24b to the base and to each other, together assure a sturdy structure that quickly dampens vibrations.

It is desireable that it be easy for a user to remove the carriage 16 from the actuator 14 when, for example, the transducers T1–T6 are to be cleaned or replaced. Removable plate 30, as will be noted in FIG. 1, can be quickly removed to provide access to the carriage.

At this point attention is directed to FIGS. 1 and 3, wherein it will be seen that various magnetic shields are integrally formed with the base 10. Shields 42a and 42b project upwardly from the base contiguous with the lands 22d and 24d upon which the lower magnets 18b and 20b are mounted. Similarly, shields 44a and 44b project downwardly from the upper pole pieces 22b and 24b, respectively, these latter shields being adjacent the upper magnets 18a and 20a. These shields are in the form of thin walls interposed between the elongate magnets and the carriage 16, and they serve to minimize any magnetic field acting on the rollers of the carriage. Also, the inner pole pieces 22a and 24a are wider than the magnets at their lower ends adjacent the base to act as shields in such locations.

Carriage 16 includes a body fabricated from aluminum or other material having a low magnetic permeability. The carriage has a shape that is generally symmetrical about the vertical plane through a centerline A—A so that the center of gravity lies in such plane. As indicated in FIG. 3, the carriage is so shaped that its center of gravity is located midway between the drive coils 32 and 34 approximately in alignment with the centerline A—A. Thus, the center of gravity is approximately aligned with the midpoint between the centers of the two coils, that is, midway between the two lines of application of force B—B and C—C.

As best seen in FIGS. 3 and 4 a single pair of rollers 52a and 52b is mounted to the upper end of the central body portion 49 (FIG. 3) of the carriage 16 to engage the upper rail 28. Two pairs of rollers 54a–54b and 56 (only one being visible in FIG. 4) are mounted to the lower end of the body portion of the carriage in longitudinally spaced relation to ride on lower rail 26. In particular, the two pairs of lower rollers are at the inner and outer ends of the carriage at a substantial distance from each other. As shown in FIG. 4 the drive coils 32, 34 are disposed equidistantly between these rollers. Upper rollers 52a and 52b are located midway between the lower pairs of rollers and above the drive coils. The longitudinal separation of the lower pairs of rollers provides longitudinal stability to the carriage.

Rails 26 and 28 are precision ground cylindrical rods. The lower rail is fixedly secured to the base 10 midway between the magnet supports 22 and 24 so that the linear path of travel defined by such rail lies in the plane of symmetry midway between the two pairs of magnets 18a–18b and 20a–20b. Base 10 has a V-shaped recess 50 formed longitudinally therein for precisely mounting rail 26 in such central orientation. The spindle 12 includes a tubular housing integrally formed in the base. It will thus be understood that the integral construction of the magnet support structures 22, 24 and the recess 50 for the lower rail provide a means for precisely orienting the actuator assembly relative to the axis of rotation of the discs.

Upper rail 28 is moveably connected to the right magnet support structure 24 so that it may swing about an axis D—D (FIG. 1) that is parallel to the lower rail and so that it will rest on the single upper pair of rollers 52a and 52b at a position that is vertically aligned with the lower rail 26, thus guiding the carriage along a vertical plane that is perpendicular to the base and that is equidistant between the two pairs of magnets 18a–18b and 20a–20b. Upper rail 28 is secured to an arm member 60 which, secured in turn, is affixed upon a shaft 62. Shaft 62 is journalled at one end in an aperture formed in a lateral projection of the end pole piece 24a of the right magnet support structure 24 and at its outer end in an aperture formed in a lateral projection at the outer end of the top pole piece 22a. The arm member is biased downwardly (i.e., preloaded) by a coil type torsion spring 66 that is mounted concentrically on the shaft 62. The arm member thus pivots about an axis that is parallel to the fixed rail 26 and that is laterally and vertically offset therefrom such that when the upper rail is engaged against the upper pair of rollers, such upper rail is vertically aligned with the lower rail. That is, the upper rail is supported in the plane of symmetry between the two pairs of magnets. It will be seen in FIG. 1 that the arm member is cut away between posts at its front and rear ends to provide clearance for the upper rollers.

Referring now to FIG. 3, carriage 16 will be seen to be symmetrical about a plane through its centerline (indicated by lines A—A in FIGS. 1 and 2 and by point A in FIG. 3). The carriage includes a central body portion and coil support extensions 68a and 68b. The central body portion is generally triangular at its top and bottom including flat inclined upper surfaces 70a and 70b that are perpendicular to each other and flat inclined lower surfaces 72a and 72b which are also perpendicular to each other. Rollers 52a and 52b rotate on shafts that project perpendicularly from the surfaces 70a and 70b, respectively; thus, the axes of rotation of these rollers are perpendicular to each other. Similarly, rollers 54a and 54b and the pair of rollers 56 are rotatably mounted on shafts that project perpendicularly from the flat surfaces 72a and 72b so that the axis of each pair of lower rollers are perpendicular to each other. The rollers are thus symmetrically mounted relative to the plane of symmetry through the centerline of the carriage so that the upper pair of rollers and the lower two pairs of rollers respectively ride against the upper and lower rails along lines of contact that are symmetrically disposed at opposite sides of the cylindrical guide rails. This two-rail, centrally-disposed arrangement will be seen to be relatively compact. It precisely guides the carriage relative to the symmetrically disposed pairs of magnets to substantially eliminate any resonant vibrations associated with the extremely rapid acceleration and deceleration of the carriage.

Coil support structures 68a and 68b support the drive coils 32 and 34 for reciprocation in the air gaps of the associated pairs of magnets 18a–18b and 20a–20b. The drive coils have identical constructions, each being formed on a rectangular mandrel so that each coil has a rectangular cross-section in the plane which is normal to its direction of travel as mounted on the carriage. Coils 32 and 34 have flat upper and lower winding sections 32a and 32b and 34a and 34b, respectively. Upper winding section 32a registers in the air gap between upper magnet 18a and shorted turn 38, and upper winding section 34a registers in the symmetrically disposed air gap between upper magnet 20a and shorted turn 39. The lower effective winding sections 32b and 34b register in the symmetrically disposed air gaps between the lower magnets 18b and shorted turn 38 and the lower magnet 20b and the associated shorted turn 39, respectively. It is noted that these flat effective winding sections are shorter in their direction of travel than the length of the magnets. Thus, the actuator motors may be referred to as being of the long-gap short-coil type.

As illustrated in FIGS. 1 and 3, coil support structures 68a and 68b each include an outer wall and a pair of spaced legs at the lower ends of such outer walls. The sides of the central body portion of the carriage have rectangular recesses formed therein in alignment, with opposed rectangular recesses being formed in the interiors of the outer walls. The rectangular drive coils are received in these opposed recesses and are affixed with a suitable adhesive mixture 74 (FIG. 3) so that the coils are generally symmetrical about the aforementioned center plane of the carriage and so that the effective winding sections thereof will properly register within the air gaps of the associated pairs of magnets. In other words, the coil support structures provide means for mounting the rectangular coils so that the coils are symmetrical about the center plane of the carriage and so that such rectangular coils are concentric with the center pole pieces of the two magnet support structures.

It will be noticed in FIG. 3 the central body portion of the carriage 16 includes recesses formed longitudinally therein to reduce its mass.

The transducers T1-T6 are mounted on flexure arms FA (shown diagrammatically in the drawings). Flexure arms FA project forwardly from separate mounting members 76 which are removably attached to complementarily formed portions at the inner end of the carriage. The lower flexure arm is secured to a fixed projection 78. The flexure arms and their mounting arrangement at the inner end of the carriage are also generally symmetrically disposed about the center plane of the carriage so that the center of gravity of the carriage lies in the center plane between the two drive coils, as stated earlier.

The coils 32a and 32b have lead wires shown diagrammatically in FIG. 1. The lead wires are connected to a conventional direct current drive circuit. It is noted that the lead wires can be connected either in series or parallel to the linear actuator drive circuit.

Although the best mode contemplated for carrying out the present invention has been herein shown and described, it will be apparent that modification and variation may be made without departing from what is regarded to be the subject matter of the invention.

What is claimed is:

1. A transducer actuator assembly for a rotating disc memory apparatus comprising: a carriage; means for mounting at least one transducer at one end of the carriage; means adjacent the periphery of the rotating disc of the memory apparatus for guiding the carriage for movement along a desired linear path of travel relative to the disc; a pair of symmetrically disposed electromagnetic motors, each including a central pole, for reciprocating the carriage to transfer the transducer to a desired track location on the rotating disc including drive coil means mounted to the carriage for forming at least two identical effective coil sections that are respectively symmetrically arranged about a plane that extends through the center of the carriage and that is parallel to its linear direction of travel, and at least two identical pairs of permanent magnets stationarily mounted to the memory apparatus near the periphery of the disc at the opposite sides of the carriage for forming two air gaps that respectively register with said two coil sections, said coil sections surrounding and forming air gaps with said central poles, whereby when said coil means is energized motive forces are applied generally along two transversely spaced lines that are symmetrical about said center plane of the carriage.

2. The actuator assembly according to claim 1, wherein said drive coil means comprises a pair of separate identical coils, each coil including a winding section that registers with the air gap of one of said pairs of permanent magnets.

3. The actuator assembly according to claim 2, wherein each coil has a rectangular outline in a plane normal to its direction of travel, the active winding section of each coil comprising a flat portion thereof.

4. The actuator assembly according to either claim 2 or claim 3, wherein the air gap of each pair of permanent magnets has a greater length in the direction of travel of the carriage than the length of the associated effective coil section.

5. The actuator assembly according to claim 1, wherein each pair of permanent magnets is supported on a structure comprising two magnet support poles that are parallel to and equidistant from the center plane of the carriage, the actuator assembly further comprising said central pole which is spaced midway between the two magnet support poles to form two air gaps at each side of the carriage center plane that are at opposite sides of the respective central pole, and said drive coil means including two effective winding sections at each side of the carriage that are symmetrically disposed relative to the center plane in registration with the air gaps of the respective pairs of magnets.

6. The actuator assembly according to claim 5, wherein said all magnets have rectangular outlines in a plane that is normal to said center plane, and each central pole has a rectangular outline so that each air gap is defined at one side by a flat surface of a magnet and at its other side by a flat surface of the associated central pole, said effective coil sections being flat to conform with the air gaps.

7. The actuator assembly according to claim 6, wherein each magnet support structure further includes an end pole which is integrally formed with the respective central pole and two magnet support poles to form an E-shaped structure.

8. The actuator assembly according to claim 7, wherein said center plane of the carriage is oriented parallel to the axis of rotation of the disc, and said integrally formed magnet support structures are integrally formed in a base member so that said end poles project outwardly from the base member.

9. The actuator assembly according to claim 8, wherein end poles of each magnet support structure are proximal the edge of the media of the memory storage apparatus.

10. The actuator assembly according to claim 9, wherein the ends of the magnet support poles and the central poles are free, the actuator further including a pole plate and means for detachably connecting the plate to said free ends so that it extends transversely between the two magnet support structures.

11. The actuator assembly according to claim 1, wherein the means for guiding the carriage includes a base member, a first straight rail rigidly mounted to the base member to determine said linear path of travel of the carriage, a second straight rail, means for mounting the second rail for swinging about an axis parallel to the first rail, rollers mounted at opposite sides of the carriage for rolling engagement with the rails, and means for biasing the movable rail toward the fixed rail to engage the carriage between the rails in rolling contact therewith.

12. The actuator assembly according to claim 11, wherein said rails are cylindrical, said rollers are cylindrical and mounted to the carriage in pairs, means for mounting the rollers to the carriage so that each pair of rollers rides against the associated rail along lines of contact on the rail that are symmetrically disposed about said center plane of the carriage.

13. The actuator assembly according to claim 12, wherein two of the pairs of rollers are mounted to the carriage at a spacing in the direction of travel that is greater than the length of the coil sections in the direction of travel.

14. The actuator assembly according to claim 12, wherein said two pairs of rollers are mounted on the carriage to ride on the fixed first rail.

15. In a magnetic disc memory storage apparatus including a base, spindle means mounted to the base for rotating at least one disc, a transducer for accessing information magnetically recorded in the disc, and an actuator assembly for moving the transducer along a straight line to distal track locations on the disc, the improvement comprising: said actuator assembly including a carriage, means for guiding the carriage along a linear path adjacent the periphery of the disc, and electromagnetic means including central poles transversely spaced at opposite sides of the carriage for applying equal and separate motive forces on the carriage including two pairs of elongate magnets, means for rigidly mounting the magnets to form at least two air gaps disposed in transversely spaced symmetrical relationship relative to a plane that lies in said linear path of travel, drive coil means mounted to the carriage for forming at least two effective winding sections in symmetrical relationship at opposite sides of said plane and respectively in alignment with said air gaps and spaced from said magnets and said central poles to apply motive forces on the carriage in symmetrical relationship relative to the center plane.

16. In the memory storage apparatus according to claim 15, said magnet mounting means including two magnet support structures that are equidistantly spaced at opposite sides of said plane each including a pair of magnet support poles and a central pole, each respective pair of said magnets being respectively mounted to the magnet support pole in spaced relationship with the respective central pole to form two air gaps at opposite sides of the respective central pole, and said drive coil means forming two separated effective coil sections at each side of the carriage that register within the associated two air gaps at the respective side of the carriage.

17. In the memory storage apparatus according to claim 16, wherein each magnet support structure further includes an end pole integrally formed in said base, with the central pole and the magnet support poles being integrally formed with the respective end pole.

18. In the memory storage apparatus according to claim 17, wherein the ends of the central poles and the magnet support poles that are opposite from the end poles are free, the magnet support structure further comprising a single pole member that is removably affixed to extend transversely between said free ends of the central and magnet support poles of the two magnet support structures.

19. In the memory storage apparatus according to claim 16, wherein the two coil sections at each side of the carriage comprise sections of a separate coil members, the separate coil members being mounted to the carriage at opposite sides of the carriage in transversely spaced symmetrical relationship.

20. In the memory storage apparatus according to either claim 15 or claim 16, wherein said magnets have rectangular outlines in a section taken normal to the path of travel of the carriage, and the effective coil sections have flat configurations for registration within the flat air gaps.

21. In the memory storage apparatus according to claim 15, wherein said means for guiding the carriage includes a first guide rail rigidly mounted to the base at a location midway between said air gaps; a second guide rail, said carriage including roller means to the carriage to roll against rails, means for movably mounting the second rail for swinging about an axis that is parallel to the first guide rail and so that it rests on the associated roller means in a position also midway between the air gaps, and spring means for biasing the second rail against the carriage.

* * * * *